United States Patent
Nakagawa et al.

(10) Patent No.: US 7,424,429 B2
(45) Date of Patent: Sep. 9, 2008

(54) INFORMATION PROCESSING APPARATUS, INFORMATION PROCESSING METHOD, PROGRAM, AND STORAGE MEDIUM

(75) Inventors: Kenichiro Nakagawa, Tokyo (JP); Hiroki Yamamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 814 days.

(21) Appl. No.: 10/460,171

(22) Filed: Jun. 13, 2003

(65) Prior Publication Data
US 2003/0236673 A1  Dec. 25, 2003

(30) Foreign Application Priority Data
Jun. 20, 2002  (JP)  .............. 2002-180053

(51) Int. Cl.
  G10L 15/00  (2006.01)
  G10L 15/04  (2006.01)
  G10L 15/18  (2006.01)
  G10L 15/28  (2006.01)

(52) U.S. Cl. .................. 704/257; 704/251; 704/255

(58) Field of Classification Search .......... 704/257, 704/251, 255
See application file for complete search history.

(56) References Cited

U.S. PATENT DOCUMENTS

| 6,216,104 | B1 * | 4/2001 | Moshfeghi et al. | 704/260 |
| 6,418,199 | B1 * | 7/2002 | Perrone | 379/88.01 |
| 6,510,417 | B1 * | 1/2003 | Woods et al. | 704/275 |
| 6,513,063 | B1 * | 1/2003 | Julia et al. | 709/219 |
| 6,587,820 | B2 * | 7/2003 | Kosaka et al. | 704/257 |
| 6,600,736 | B1 * | 7/2003 | Ball et al. | 370/352 |
| 6,662,157 | B1 * | 12/2003 | Horowitz et al. | 704/235 |
| 6,687,734 | B1 * | 2/2004 | Sellink et al. | 709/203 |
| 6,757,657 | B1 * | 6/2004 | Kojima et al. | 704/275 |
| 6,757,718 | B1 * | 6/2004 | Halverson et al. | 709/218 |
| 6,917,920 | B1 * | 7/2005 | Koizumi et al. | 704/277 |
| 2003/0156689 | A1 | 8/2003 | Ando et al. | |

FOREIGN PATENT DOCUMENTS

| JP | 7-146767 | 6/1995 |
| JP | 10-105357 | 4/1998 |
| JP | 10-154063 | 6/1998 |
| JP | 2001-42890 | 2/2001 |
| JP | 2001-166915 | 6/2001 |
| JP | 2002-7019 | 1/2002 |
| JP | 2003-241795 | 8/2003 |

* cited by examiner

Primary Examiner—David R. Hudspeth
Assistant Examiner—Justin W Rider
(74) Attorney, Agent, or Firm—Fitzpatrick, Cella, Harper & Scinto

(57) ABSTRACT

The correspondence between input fields and grammars is obtained (S102), and a speech utterance example is displayed using a grammar corresponding to a portion (field) designated by an input instruction (S106). Also, a speech recognition process is executed using this grammar (S108). The speech recognition result is displayed in the field designated by the input instruction (S109). Upon reception an instruction for transmitting input data to an application, the input data is transmitted to the application (S110).

8 Claims, 11 Drawing Sheets

CONTENTS OF #long.grm import <station.grm>;

public <keiro>=FROM <station>{departure} TO <station>{destination} |
⠀⠀⠀⠀⠀⠀⠀⠀⠀⠀⠀⠀⠀⠀FROM <station>{departure} |
⠀⠀⠀⠀⠀⠀⠀⠀⠀⠀⠀⠀⠀⠀TO <station>{destination};

CONTENTS OF #station.grm public <station> =

TOKYO |

OSAKA |

⋮

NAGOYA;

| TAG NAME | GRAMMAR NAME |
|---|---|
| keiro | http://temp/long.grm#keiro |
| departure | http://temp/station.grm#station |
| destination | http://temp/station.grm#station |

| TAG NAME | INPUT DATA |
|---|---|
| departure | TOKYO |
| destination | OSAKA |

F I G. 8

```
<html>
<body>
<from name "keiro" grammar = "http://temp/long.grm#keiro"
        explanation = PLEASE PRONOUNCE LIKE "FROM TOKYO TO OSAKA">   ···501
<input type = "text" name = "departure" grammar = "http://temp/station.grm#station"
        explanation = FROM 'PLEASE PRONOUNCE LIKE "TOKYO" '>         ···502
<input type = "text" name = "destination" grammar = "http://temp/station.grm#station"
        explanation TO 'PLEASE PRONOUNCE LIKE "OSAKA" '>             ···503
</form>                                                              ···504
</body>
</html>
```

F I G. 11A
F I G. 11B
SELECT ENTIRE <form>
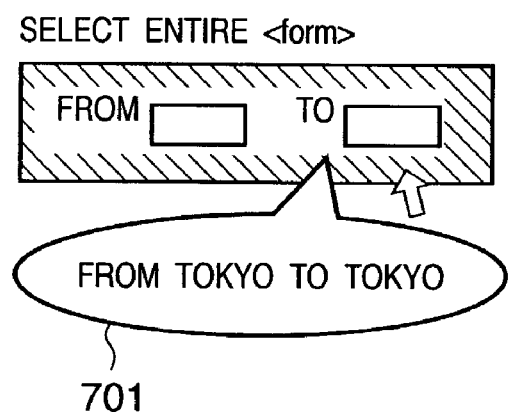
701
SELECT <input>
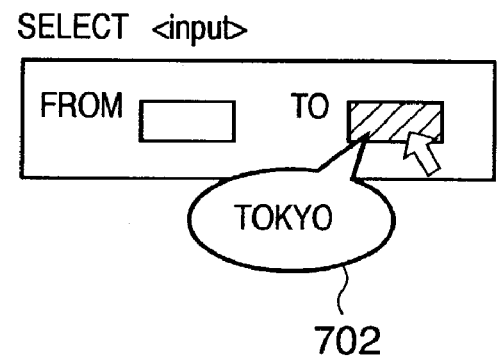
702

INFORMATION PROCESSING APPARATUS, INFORMATION PROCESSING METHOD, PROGRAM, AND STORAGE MEDIUM

FIELD OF THE INVENTION

The present invention relates to an information processing apparatus, information processing method, program, and storage medium, which display an input field used to input data, and achieve a predetermined task on the basis of data input to the input field.

BACKGROUND OF THE INVENTION

A conventional speech recognition technique is implemented by creating a program. However, in recent years, speech recognition is implemented using a hypertext document such as VoiceXML or the like. VoiceXML basically uses speech alone as input/output means (user interface) (strictly speaking, DTMF or the like is also used). Japanese Patent Laid-Open Nos. 2001-166915, 10-154063, and the like use a hypertext document to describe a user interface which uses speech input/output and GUI (Graphical User Interface) together. To describe this GUI, a hypertext document such as HTML or the like is used. Furthermore, in order to allow speech input/output, some tags corresponding to speech input and output are added.

A so-called multimodal user interface that uses a GUI and speech input/output together requires a description about cooperation among respective modalities such as speech input by means of speech recognition, speech output by means of speech synthesis, graphical presentation of user's inputs and information by means of a GUI, and the like. For example, Japanese Patent Laid-Open No. 2001-042890 discloses a method in which buttons, input fields, and speech inputs are associated with each other, an associated input field is selected upon depression of a given button, and a speech recognition result is input to the selected field.

In consideration of inputs to input fields on a Web or dialog application, a field to which an input from a keyboard or the like is input must be presented to the user. In general, a currently input-enabled field is distinguished from other fields by focus emphasis. In consideration of input by means of speech, it is required to emphasize a field to which data is to be input. Since speech recognition readily causes recognition errors, it is required to decrease user's utterance errors by presenting to the user an utterance example of data to be input in an input field.

The present invention has been made in consideration of the aforementioned problems, and has as its object to allow smooth input of data to an input field when data is to be input to the input field by a speech input. It is another object of the present invention to specify an input field and a speech recognition result to be input to that input field.

SUMMARY OF THE INVENTION

According to the present invention, the foregoing object is attained by providing an information processing apparatus for displaying a plurality of input fields used to input data, and achieving a predetermined task on the basis of data input to the input fields, comprising:

designation means for designating at least one of the plurality of input fields;

speech recognition means for recognizing speech externally input for the purpose of inputting data to the input field designated by the designation means using a grammar corresponding to the input field; and utterance example output means for visibly or audibly outputting an utterance example upon inputting data to the input field designated by the designation means.

According to the present invention, the foregoing object is attained by providing an information processing apparatus comprising:

display means for displaying a plurality of input fields used to input data from a user;

designation means for designating at least one of the plurality of input fields displayed by the display means; and presentation means for presenting the input example upon inputting data to the input field designated by the designation means.

According to the present invention, the foregoing object is attained by providing an information processing method for displaying a plurality of input fields used to input data, and achieving a predetermined task on the basis of data input to the input fields, comprising:

a designation step of designating at least one of the plurality of input fields;

a speech recognition step of recognizing speech externally input for the purpose of inputting data to the input field designated in the designation step using a grammar corresponding to the input field; and an utterance example output step of visibly or audibly outputting an utterance example upon inputting data to the input field designated in the designation step.

According to the present invention, the foregoing object is attained by providing an information processing method comprising:

a display step of displaying a plurality of input fields used to input data from a user;

a designation step of designating at least one of the plurality of input fields displayed in the display step; and a presentation step of presenting the input example upon inputting data to the input field designated in the designation step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 shows an example of document data used in the first embodiment of the present invention;

FIGS. 11A and 11B respectively show character strings displayed in the emphasis processes of the parent field and designated child field.

DETAILED DESCRIPTION OF THE PREFERRED EMBODIMENTS

Preferred embodiments of the present invention will now be described in detail in accordance with the accompanying drawings.

First Embodiment

Figure 1:
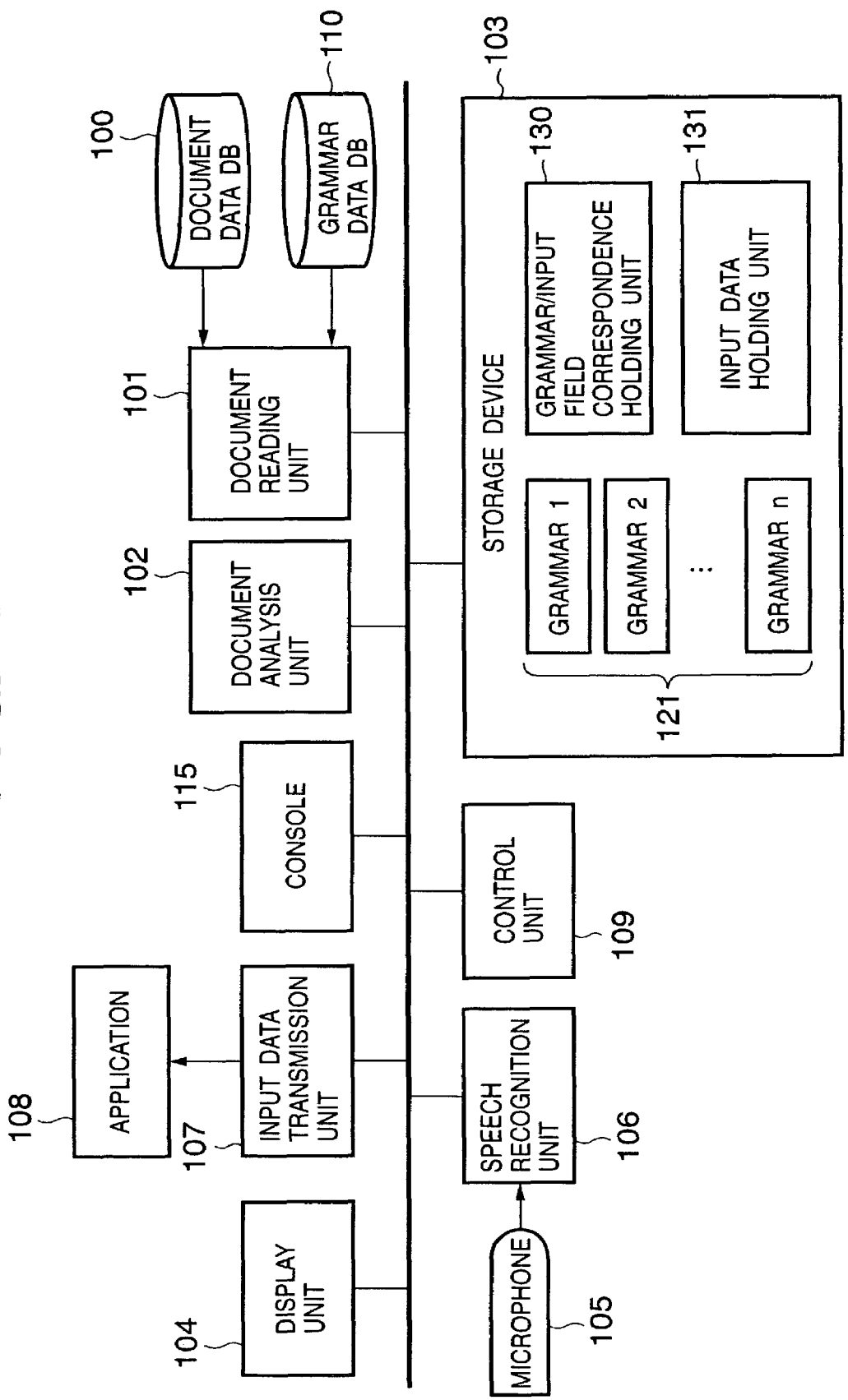
FIG. 1 is a block diagram showing the basic arrangement of an information processing apparatus according to an embodiment of the present invention.
Figure 2:
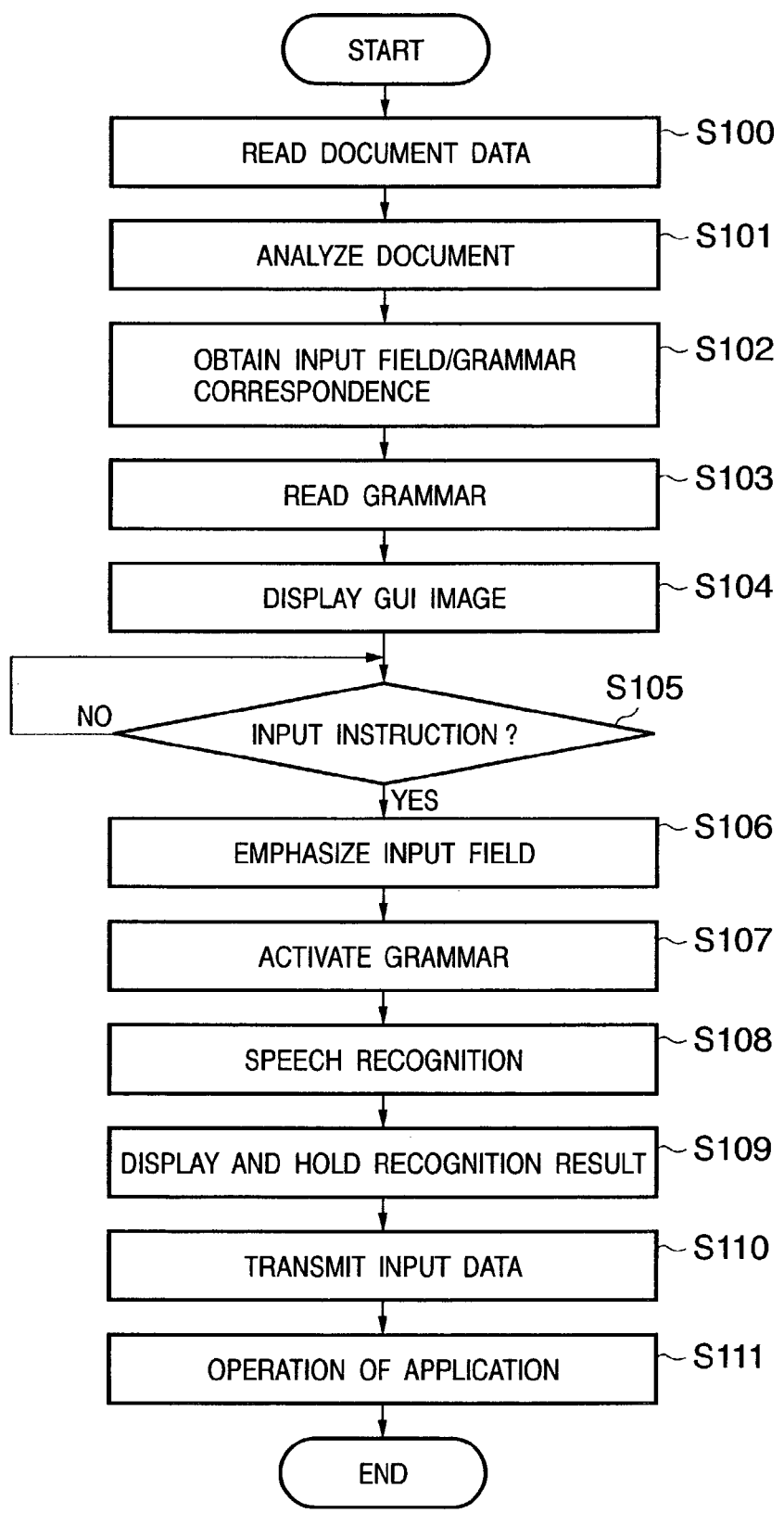
FIG. 2 is a flow chart of a process to be executed by the information processing apparatus shown in FIG. 1.

FIG. 1 is a block diagram showing the basic arrangement of an information processing apparatus of this embodiment. FIG. 2 is a flow chart of the process to be executed by the information processing apparatus of FIG. 1. The arrangement of the information processing apparatus of this embodiment, and the process to be executed by the information processing apparatus will be described below using FIGS. 1 and 2.

Figure 3:
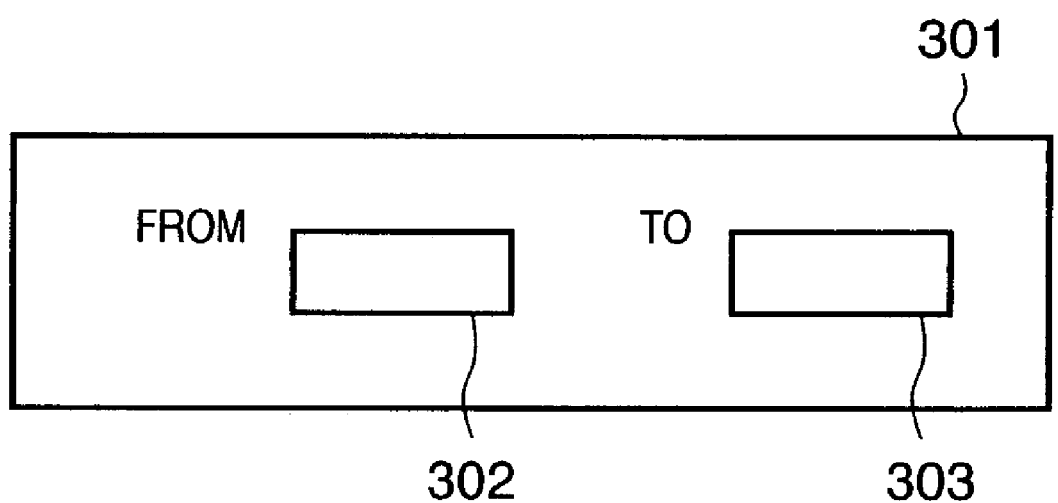
FIG. 3 shows a display example of document data shown in FIG. 8 on a GUI.

A document reading unit 101 reads document data from a document data DB (database) 100 that stores document data (step S100). Document data is described in a description language such as a markup language or the like, and describes the design of a GUI, the operations of speech recognition/synthesis, the locations of grammars, and the like. A document analysis unit 102 analyzes the structure of the document data read by the document reading unit 101 (step S101). FIG. 8 shows an example of document data. FIG. 3 shows a GUI display example of this document data (displayed using a predetermined browser).

Referring to FIG. 8, input tags 502 and 503 are displayed as input fields (child fields) 302 and 303, as shown in FIG. 3. Also, form tags 501 and 504 are displayed as, e.g., a frame line (parent field) 301 that includes input tag elements in that form tag, and indicate input elements (e.g., input) to be included in form. The form tag 501 can set attributes for input fields defined by a plurality of input tags. The two input tags 502 and 503 bounded by the form tags 501 and 504 are included in a form name "keiro". Attributes grammar included in the tags 501, 502, and 503 indicate the locations (addresses) where grammars are held. In this embodiment, the grammars are held in this apparatus. However, the present invention is not limited to this. For example, the grammars may be held in an external apparatus connected via a LAN or Internet.

Figure 6:
FIG. 6 shows the configuration of tag names and grammar names held by a grammar/input field correspondence holding unit 130.

A control unit 109 obtains correspondence between the input fields and grammars on the basis of the analysis result of the document analysis unit 102 (step S102). In this embodiment, as shown in FIG. 8, a grammar "http://temp/long.grm#keiro" corresponds to form with a name "keiro", a grammar "http://temp/station.grm#station" corresponds to input with a name "departure", and a grammar "http://temp/station.grm#station" corresponds to input with a name "destination". The control unit 109 generates data indicating such correspondence on the basis of the analysis result of the document analysis unit 102, and outputs the data to a grammar/input field correspondence holding unit 130 in a storage device 103. The grammar/input field correspondence holding unit 130 holds the input data in a format in which the tag names and grammar names (grammar file names) are associated with each other, as shown in, e.g., FIG. 6. FIG. 6 shows the configurations of the tag names and grammar names held by the grammar/input field correspondence holding unit 130.

The document reading unit 101 reads grammar data corresponding to the document data read in step S100 from a grammar DB (database) 110 that stores grammar data (step S103). In this embodiment, three grammars located at the addresses indicated by "http://,,,," in the tags 501, 502, and 503 are read, and are stored in the storage device 103 as a grammar data group 121 (n=3 in this embodiment).

The control unit 109 instructs a display unit 104 to display the analysis result of step S101 (step S104). The analysis result is displayed as a GUI, as shown in FIG. 3, as described above. The display unit 104 comprises a CRT, liquid crystal display screen, or the like.

It is then checked if the user has input an instruction from a console 115 (step S105). The input instruction indicates one to be selected of the input fields 301, 302, 303, and the like. The input instruction may be issued by a physical button using the console 115, or by pressing a GUI element displayed on the display unit 104 using the console 115. For example, when the user wants to select the input field 302 or 303, he or she can press a region within each frame line by a pointing device included in the console 115. When the user wants to select the input field 301, he or she can press a region outside the regions of the input fields 302 and 303 and within the frame line of the input field 301 by the pointing device. Upon detection of such user's input instruction, the flow advances to step S106.

Figure 9A:
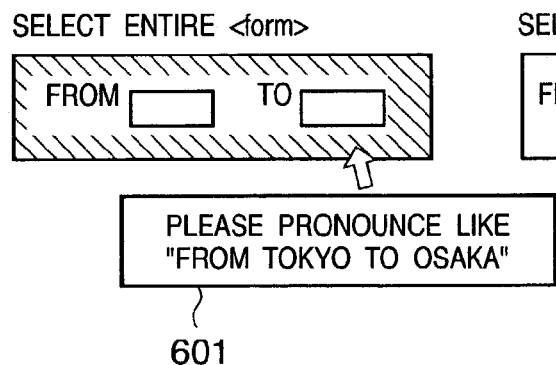
FIGS. 9A and 9B respectively show emphasis of a parent field, emphasis of a designated child field, and utterance examples for these fields.
Figure 9B:
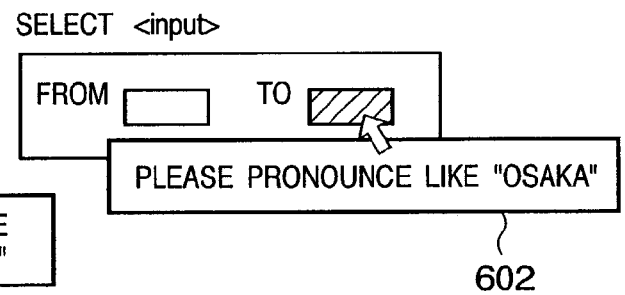

The control unit 109 emphasizes a portion (field) designated by the input instruction of those displayed on the display unit 104 to present the currently input-enabled field to the user, and displays an input example to that input-enabled field (step S106). FIGS. 9A and 9B respectively show emphasis of a parent field, emphasis of a designated child field, and utterance examples for these fields. When the user has designated a position within the parent field and outside the child fields, as shown in FIG. 9A, it is determined that the parent field is designated. In this case, the outer frame of the parent field is thickened, and the drawing color within the region of that field is changed. Furthermore, when the parent field contains text display, its font is changed to bold, the size is increased, and the text color is changed. On the other hand, when the user has selected a specific child field, as shown in FIG. 9B, the outer frame of that field is thickened, and the drawing color is changed.

As shown in FIGS. 9A and 9B, utterance examples of entries to be input to the respective input fields are presented as popup text under the mouse pointer. In FIG. 9A, since the user has designated form, popup text 601 of a comment [please pronounce like "from Tokyo to Osaka"] is displayed. On the other hand, since the user has designated one child field in FIG. 9B, popup text 602 of a comment [please pronounce like "Osaka"] is displayed.

These character strings can be embedded upon creating contents, as shown in FIG. 8. In this example, these character strings are embedded in explanation attributes of input elements.

The control unit 109 activates the grammar corresponding to the field designated by the input instruction (step S107). Activating the grammar amounts to setting to recognize the designated grammar in a speech recognition unit 106. For example, when the user has selected the field 301 in FIG. 3, since that field 301 corresponds to the form tag 501, the grammar long.grm described in the form tag 501 is activated and, as a result, the speech recognition unit 106 executes a speech recognition process using the grammar long.grm. Likewise, when the user has selected the field 302, since that field 302 corresponds to the input tag 502, the grammar station.grm described in the input tag 502 is activated and, as a result, the speech recognition unit 106 executes a speech recognition process using the grammar station.grm. The same applies to a case wherein the user has selected the field 303.

Figure 4:
FIG. 4 shows a description example of long.grm.
Figure 5:
FIG. 5 shows a description example of station.grm.

FIG. 4 shows a description example of the grammar long.grm, and FIG. 5 shows that of the grammar station.grm. Using the grammar station.grm, the speech recognition unit 106 can recognize utterances "Tokyo", "Osaka", "Nagoya", and the like. Using the grammar long.grm, the speech recognition unit 106 can recognize utterances "from XX to ○○", "from XX", "to ○○", and the like. Note that "XX" and "○○" use contents described in station.grm. That is, "from Tokyo to Osaka", "from Nagoya", "to Tokyo", and the like can be recognized.

Hence, the speech recognition unit 106 executes a speech recognition process using the grammar which is input from the user via the microphone 105 and is activated in step S107 (step S108). Since a speech recognition technique using a grammar adopts a known technique, a description that pertains to speech recognition will be omitted.

The speech recognition result of the speech recognition unit 106 is displayed within the field designated by the input instruction in step S105 (step S109). For example, when the user has selected the field 302 and uttered "Tokyo", Tokyo is displayed in the field 302. However, since the field 301 defined by the form tag includes a plurality of input fields 302 and 303, the fields to be displayed are determined by the following method.

The following explanation will be given according to the grammar description shown in FIG. 4. In the grammar description, portions bounded by { } are analyzed, and their results are input to fields described in { }. For example, when the user has uttered "from Tokyo to Osaka" in front of a microphone 105, the speech recognition unit 106 recognizes the station names "Tokyo" and "Osaka" in turn in the utterance contents. As a result, it is determined that "Tokyo" corresponds to {departure} and "Osaka" corresponds to {destination}.

From this correspondence, "Tokyo" is displayed in the field 302 corresponding to "departure", and "Osaka" is displayed in the field 303 corresponding to "destination". Also, when the user has uttered "from Nagoya", since it corresponds to {departure}, "Nagoya" is displayed in the field 302. Furthermore, when the user has uttered "to Tokyo", since it corresponds to {destination}, "Tokyo" is displayed in the field 303. That is, when the user has selected the field 301, the speech recognition results are displayed in the fields 302 and 303 in turn or at the same time in accordance with the utterance contents.

Figure 7:
FIG. 7 shows an example of data to be stored in an input data holding unit 131 when utterance contents "from Tokyo to Osaka" are input to a speech recognition unit 106, and the speech recognition unit 106 makes speech recognition of the input contents.

In step S109, input data input to the respective fields (the fields 302 and 303 in FIG. 3) are stored in an input data holding unit 131 together with data (tag names) indicating the input fields. FIG. 7 shows an example of data to be stored in the input data holding unit 131 when the utterance contents "from Tokyo to Osaka" are input to the speech recognition unit 106, and the speech recognition unit 106 makes speech recognition of the contents. As shown in FIG. 7, the tag names as data indicating the fields where input data are displayed, and the displayed input data (speech recognition results) are associated with each other.

If the user has input an instruction for transmitting the input data to an application 108, the control unit 109 instructs an input data transmission unit 107 to transmit the data held by the input data holding unit 131 in the storage device 103 to the application 108 (step S110). The application 108 is software which searches for, e.g., a plurality of routes between the two input stations, and calculates travel times when the found routes are used. The control unit 109 executes the application 108 using the transmitted data, and the application 108 makes the above operations and displays the operation results on the display unit 104 (step S111).

As described above, the information processing apparatus of this embodiment can present an utterance example for a field or field group designated by a user's input instruction, and can enter input data according to the speech recognition result, since fields that allow data input are associated with grammar data and utterance examples, thus allowing the user to more easily operate software using speech input.

Second Embodiment

When the information processing apparatus comprises a speech output device, the speech output device may read aloud a popup character string as an utterance example of each field by speech.

Third Embodiment

In the first embodiment, the utterance examples of the input fields are embedded in markup document data. Alternatively, (data of) the utterance examples can be generated as needed from the grammars corresponding to the input fields. This generation method will be described below using FIGS. 10, 11A, and 11B. Since processes other than emphasis of the input field, and the arrangement of the information processing apparatus are the same as those described in the first embodiment, a description thereof will be omitted.

Figure 10:
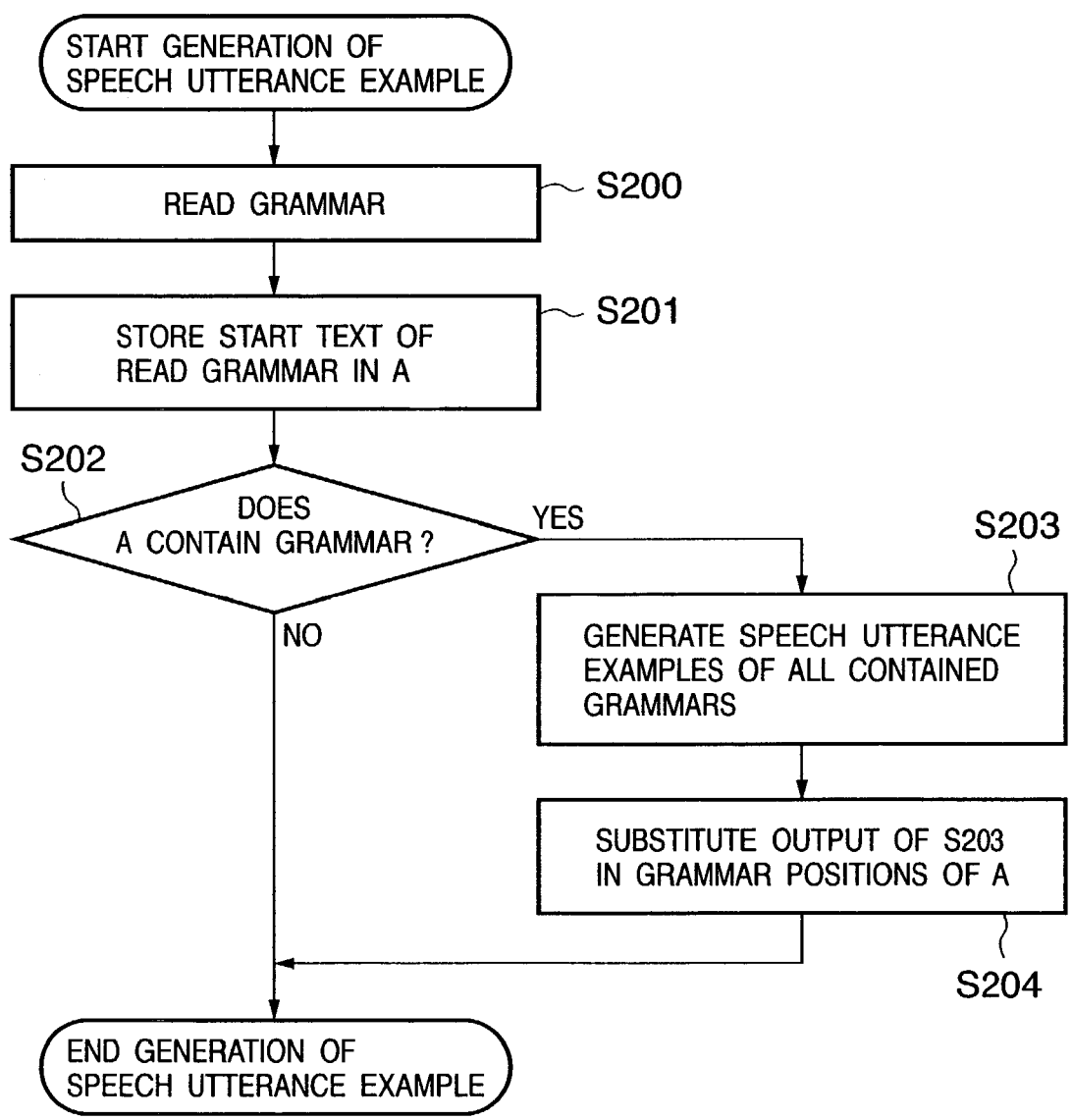
FIG. 10 is a flow chart of a process for generating an utterance example of speech as needed.

FIG. 10 is a flow chart of a process for generating an utterance example of speech as needed. This process is called from the input field emphasis process (step S106). When the user has selected a specific input field, this process is called using a grammar corresponding to that input field as an argument. FIG. 10 exemplifies a process upon generating an utterance example of long.grm in FIG. 4.

An objective grammar (long.grm) is read (step S200). First utterance text described in the read grammar is stored in variable A (step S201). In case of long.grm, the first utterance text is "from <station> to <station>", and this character string is stored in variable A.

It is then checked if A contains a grammar. In this example, since <station> is a grammar, the flow advances to step S203. Speech utterance examples of all contained grammars are acquired by recursively calling this process. <station> is the grammar shown in FIG. 5, and by executing this process using station.grm as an argument, an utterance example "Tokyo" can be acquired as the first utterance text of <station>. The utterance example acquired in step S203 is substituted in each grammar position in variable A (step S204). In this example, since a character string "Tokyo" is substituted in the position of <station>, variable A is "from Tokyo to Tokyo". Note that any of station names shown in FIG. 5 may be used as an acquisition example of an utterance example.

Upon completion of the above process, variable A stores the utterance example which does not contain any grammars. In this example, data "from Tokyo to Tokyo" is generated as an utterance example of long.grm.

FIGS. 11A and 11B show a display example of the speech utterance example generated by this process on a GUI. FIGS. 11A and 11B respectively show character strings displayed in the emphasis processes of the parent field and designated child field. In FIGS. 11A and 11B, utterance examples are presented to the user using popup words balloons 701 and 702. The speech utterance example may be displayed on the screen in this way, or when the information processing apparatus comprises a speech output device, the speech output device may read aloud this popup character string by speech.

Fourth Embodiment

Emphasis of the input field described in the above embodiment may start immediately after the user has designated the input field or may start upon the elapse of a predetermined period of time with no user's actions after the instruction. In the latter case, the utterance example of the input field is presented to only the user who cannot smoothly proceed to an input operation (speech utterance) after designation of the input field.

Document data in the above embodiments can be easily customized since it is provided using a description language such as a markup language or the like.

In the above embodiments, software that searches for routes between two stations has been exemplified as application software. However, the present invention is not limited to such specific software, and can be suitably applied to application software which has many input fields, and requires to input data to all input fields.

Another Embodiment

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit. When the present invention is applied to the storage medium, that storage medium stores the program codes corresponding to the aforementioned flow charts.

As described above, according to the present invention, when data is to be input to an input field by speech input, the data can be smoothly input to this input field. Also, the present invention can present an utterance example for the input field to the user so as to obtain a correct speech recognition result.

As many apparently widely different embodiments of the present invention can be made without departing from the spirit and scope thereof, it is to be understood that the invention is not limited to the specific embodiments thereof except as defined in the claims.

What is claimed is:

1. An information processing apparatus for (i) displaying a plurality of input fields, each of which is used to input a word, and (ii) achieving a predetermined task on the basis of at least one word input into at least one of the plurality of input fields, the apparatus comprising:

means for storing, for each of the plurality of input fields, first grammar information which indicates a first grammar to be used for inputting a word into the respective input field, where the first grammar information includes information to be used for specifying words which can be used in the first grammar;

means for storing second grammar information which indicates a second grammar to be used for inputting a word into each respective input field of the plurality of input fields through a single utterance, where the second grammar information includes information to be used for specifying words which can be used in the second grammar;

designation means for designating at least one of the plurality of input fields;

first selection means for, when a single input field is designated by said designation means, selecting a word from the words specified by the first grammar information corresponding to the designated input field;

first generation means for generating a single-field utterance example to be referred to for inputting a word into the designated input field, the single-field utterance example being generated by using the word selected by said first selection means and the first grammar information corresponding to the designated input field;

first output means for visibly or audibly outputting the single-field utterance example generated by said first generation means;

second selection means for, when the plurality of input fields is designated by said designation means, selecting words corresponding to the designated input fields from the words specified by the second grammar information;

second generation means for generating a multiple-field utterance example to be referred to for inputting a word into each of the designated input fields through a single utterance, the multiple-field utterance example being generated by using the words selected by said second selection means and the second grammar information;

second output means for visibly or audibly outputting the multiple-field utterance example generated by said second generation means; and speech recognition means for recognizing speech which is externally input for the purpose of inputting at least one word into at least one respective input field designated by said designation means.

2. The apparatus according to claim 1, wherein said first output means visibly or audibly outputs the single-field utterance example generated by said first generation means upon an elapse of a predetermined period of time after designation by said designation means.

3. A computer program product, stored on a computer-readable medium, comprising computer-executable program code for enabling a computer to function as an information processing apparatus of claim 1.

4. A computer-readable storage medium storing a computer program product of claim 3.

5. The apparatus according to claim 1, wherein said second output means visibly or audibly outputs the multiple-field utterance example generated by said second generation means upon an elapse of a predetermined period of time after designation by said designation means.

6. An information processing method for (i) displaying a plurality of input fields, each of which is used to input a word, and (ii) achieving a predetermined task on the basis of at least one word input into at least one of the input fields, the method comprising:

a step of storing, for each of the plurality of input fields, first grammar information which indicates a first grammar to be used for inputting a word into the respective input field, where the first grammar information includes information to be used for specifying words which can be used in the first grammar;

a step of storing second grammar information which indicates a second grammar to be used for inputting a word into each respective input field of the plurality of input fields through a single utterance, where the second grammar information includes information to be used for specifying words which can be used in the second grammar;

a designation step of designating at least one of the plurality of input field;

a first selection step of, when a single input field is designated in said designation step, selecting a word from the words specified by the first grammar information corresponding to the designated input field;

a first generation step of generating a single-field utterance example to be referred to for inputting a word into the designated input field, the single-field utterance example being generated by using the word selected in said first selection step and the first grammar information corresponding to the designated input field;

a first output step of visibly or audibly outputting the single-field utterance example generated in said first generation step;

a second selection step of, when the plurality of input fields is designated in said designation step, selecting words corresponding to the designated input fields from the words specified by the second grammar information;

a second generation step of generating a multiple-field utterance example to be referred to for inputting a word into each of the designated input fields, the multiple-field utterance example being generated by using the words selected in said second selection step and the second grammar information;

a second output step of visibly or audibly outputting the multiple-field utterance example generated in said second generation step; and a speech recognition step of recognizing speech which is externally input for the purpose of inputting at least one word into at least one respective input field designated in said designation step.

7. A computer program product, stored on a computer-readable medium, comprising computer-executable program code for enabling a computer to execute an information processing method of claim 6.

8. A computer-readable storage medium storing a computer program product of claim 7.

* * * * *